(12) United States Patent
Kondo

(10) Patent No.: US 6,702,174 B2
(45) Date of Patent: Mar. 9, 2004

(54) WIRE FIXING JIG

(75) Inventor: Masayuki Kondo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/012,314

(22) Filed: Dec. 12, 2001

(65) Prior Publication Data

US 2002/0074383 A1 Jun. 20, 2002

(30) Foreign Application Priority Data

Dec. 20, 2000 (JP) ........................................ 2000-387633

(51) Int. Cl.[7] .............................................. B23K 37/04
(52) U.S. Cl. ........................ 228/49.1; 228/4.5; 228/1.1
(58) Field of Search .............................. 228/4.5, 180.5, 228/1.1, 110.1, 49.1, 44.3; 140/112; 219/56, 56.1, 56.21, 56.22, 91.21

(56) References Cited

FOREIGN PATENT DOCUMENTS

| JP | 7-326456 | * 12/1995 | .......... H01R/43/02 |
|----|----------|-----------|----------------------|
| JP | 9-29445  | * 2/1997  | .......... B23K/11/00 |

* cited by examiner

Primary Examiner—Tom Dunn
Assistant Examiner—Kevin Kerns
(74) Attorney, Agent, or Firm—Sughrue Mion, PLLC

(57) ABSTRACT

A wire fixing jig for arranging and fixing covered wires when intersection portions thereof are welded. The jig has a jig body on which the covered wires are arranged, supporting portions for supporting the covered wires are formed around the intersection portions to be welded. These portions are located at a predetermined pitch from a corresponding one of the intersection portions, at both sides in the longitudinal direction thereof and for ensuring a space that allows a core part of each of the intersection portions, which are pressurized when welded, to spread out, and through holes through which welding device is inserted when the intersection portions of the covered wires are welded to each other.

12 Claims, 4 Drawing Sheets

WIRE FIXING JIG

BACKGROUND OF THE INVENTION

1. Field of the Invention

The present invention relates to a wire fixing jig for fixing a plurality of covered wires when a circuit is formed by causing the plurality of covered wires to intersect with each other and then welding the wires at points of intersection.

The present application is based on Japanese patent Application No. 2000-387633, which is incorporated herein by reference.

2. Description of Related Art

When a circuit is formed by connecting a plurality of electrical conductors to one another, the electrical conductors are sometimes made to intersect with one another. Then, intersection portions of the electrical conductors are welded to one another by ultrasonic welding. In this case, the electrical conductors are fixed by a wire fixing jig in such a manner as not to shift when the ultrasonic welding is performed.

A conventional wire fixing jig is described in JP-A-9-29445. As shown in FIG. 5, this conventional wire fixing jig 13 has a plate-like fixing jig body 3, on which the electrical conductors 1 are arranged. The jig 13 is further provided with a plurality of accommodating grooves 5, which are formed in the jig body 3, and a plurality of through holes 7 formed therein respectively corresponding to the points of intersection of the accommodating grooves 5.

The accommodating grooves 5 are provided in a grating-like manner in the top surface portion of the fixing jig body 3. When arranged on the fixing jig body 3, the electrical conductors 1 are respectively accommodated in the accommodating grooves 5 thereby to be fixed to the fixing jig body 3.

Further, the through holes 7 are formed at the points of intersection of the accommodating grooves 5 arranged in a grating-like manner, respectively, and each penetrate the fixing jig body 3 from the top surface thereof to the bottom surface thereof. As shown in FIG. 6, each of these through holes 7 permits a pair of horns 11, which serve as welding device for welding intersection portions of electrical conductors 1 arranged in a grating-like manner on the fixing jig body 3, to penetrate therethrough. Further, the inner peripheral surface of each of the through holes 7 has a diameter that is nearly equal to or slightly larger than the diameter of the outer peripheral surface of each of the pair of horns 11.

When the electrical conductors 1 are connected to one another by using such a wire fixing jig 13, first, the electrical conductors 1 are accommodated in the accommodating grooves 5, and the conductors 1 are fixed to the fixing jig body 3 in such a way as to be arranged in a grating-like manner. Subsequently, intersection portions 9 of the electrical conductors 1 fixed to and arranged on the fixing jig body 3 in a grating-like manner are ultrasonic-welded by the pair of horns 11. At that time, the pair of horns 11 are set so that the diameter of the outer peripheral surface of each of the horns 11 is nearly equal to the diameter of the outer peripheral surface of each of the electrical conductors 1.

When the intersection portions 9 of the electrical conductors 1 are ultrasonic-welded, the intersection portions 9 and the pair of horns 11 are mutually positioned, as illustrated in FIG. 6. During this state, the pair of horns 11 are introduced into a corresponding one of the through holes 7 (not shown) from above and below, respectively. Thus, each of the intersection portions 9 of the plurality of electrical conductors 1 is held between a corresponding pair of the electrical conductors 1.

Then, when each of the intersection portions 9 is ultrasonic-vibrated by the corresponding pair of horns 11 during pressurized therebetween, opposed end portions of the horns 11 are crushed by the corresponding intersection portion 9, and thus spread in the direction of width thereof, so that the contact area of each of the end portions increases, and that the end portions are welded to each other.

When a plurality of covered wires are ultrasonic-welded by using the wire fixing jig 13, the wires are first accommodated in the accommodating grooves 5 and then fixed to the fixing jig body 3 in a grating-like manner, and ultrasonic-vibrated by simultaneously pressurizing intersection portions of the covered wires by means of the horns 11, similarly as in the case of ultrasonic-welding the electrical conductors 1.

When the covered wires are ultrasonic-vibrated by simultaneously pressurizing the intersection portions of the covered wires by means of the horns 11, the cover portions of the plurality of covered wires, which are in contact with one another at the intersection portions thereof, and the cover portions of the plurality of covered wires, which are in contact with the horns 11, are melted by ultrasonic vibration performed by the horns 11. At that time, the cover portions melted owing to pressurization performed by the horns 11 are extruded outwardly. Moreover, core parts of the wires come into contact with each other in a state in which these core parts are spread in the direction of width thereof.

Then, when ultrasonic vibration is performed on the intersection portions by the horns 11 during the intersection portions are pressurized, the core parts of the intersection portions of the plurality of covered wires, which are in contact with each other, are welded to each other.

However, in the case of the conventional wire fixing jig 13, each of the electrical conductors 1 is nearly equal in diameter to each of the horns 11. Each of the through holes 7 is formed in such a way as to have a diameter that is approximately equal to or slightly larger than the diameter of each of the horns 11. Therefore, the diameter of each of the through holes 7 is almost equal to or slightly larger than that of each of the electrical conductors 1. Thus, a space formed between the periphery of each of the intersection portions 9 and the inner peripheral surface of a corresponding one of the through holes 7 is small in a state in which the of electrical conductors 1 are arranged on the fixing jig body 3.

Thus, in the case of using the wire fixing jig 13 for connecting the covered wires, when the cover portions melted owing to the ultrasonic vibration performed by the horns 11 are extruded by being pressurized by means of the horns 11, there is a fear that the inner peripheral surface of the through hole 7 restrains the extrusion of the melted cover portions, and that the core parts are thus restrained from being spread in the direction of width thereof.

Hence, the wire fixing jig 13 has encountered problems that the core parts of the intersection portions of the covered wires are insufficiently electrically conducted in a state in which the core parts are welded to each other, and that the connection among the covered wires is electrically unstable.

Conversely, when the space formed between the peripheral surface of the corresponding one of the intersection portions and the inner peripheral surface of the corresponding one of the through holes 7 is enlarged by making the diameter of each of the through holes 7 larger than the diameter of the corresponding covered wire, the diameter of each of the through holes 7 becomes large in comparison with that of each of the corresponding horns 11. Thus, there is a fear that the entire fixing jig body 3 is shifted with respect to the horns 11 when the intersection portions are pressurized and ultrasonic-vibrated by the horns 11, and in that state, in which the positioning of the intersection portions and the horns 11 is performed, is canceled.

Consequently, in the wire fixing jig 13, the welding of the core parts at the intersections of the covered wires cannot be reliably performed. Thus, sometimes, the connection between the intersection portions is electrically unstabilized.

Furthermore, when not only the diameters of the thorough holes 7 but the diameters of the horns 11 are set in such a way as to be larger than the diameters of the covered wires, there is a fear that the size of the entire welding device increases.

SUMMARY OF THE INVENTION

An object of the invention is to provide a wire fixing jig enabled to electrically stably connect covered wires and to prevent the size of welding device from increasing.

To achieve the foregoing object, according to the invention, there is provided a wire fixing jig (hereinafter referred to as a first wire fixing jig) for arranging a plurality of covered wires each having a core part, which is constituted by a plurality of electrical conductors and insulated by being coated with a cover portion, in such a way as to intersect with a corresponding one of the remaining covered wires and for fixing the plurality of covered wires by being used when intersection portions are welded by simultaneously being pressurized by welding device so as to form a predetermined circuit. The wire fixing jig comprises a plate-like fixing jig body on which the plurality of covered wires are arranged, a plurality of supporting portions, which are formed at least around the intersection portions to be welded, each for supporting a corresponding one of the plurality of covered wires at positions, of which are located at predetermined pitches from a corresponding one of the intersection portions, at both sides in a longitudinal direction thereof and for ensuring a space that allows a core part of each of the intersection portions, which are pressurized when welded, to spread out, and through holes, which are provided in the fixing jig body correspondingly to the intersection portions of the plurality of covered wires placed on the fixing jig body and adapted so that the welding device is inserted into and penetrates through each of the through holes when the intersection portions of the plurality of covered wires are welded to each other.

According to the first fixing jig of such a configuration, a plurality of covered wires are arranged on the fixing jig body so that each of the covered wires intersects with a corresponding one of the remaining covered wires. Further, each of the covered wires is supported by the corresponding supporting portions around the corresponding intersection portion, which is welded, at positions, each of which is located at a predetermined pitch from a corresponding one of the intersection portions, at both sides in the longitudinal direction of each of the covered wires. At that time, a space is ensured by the corresponding supporting portions around the corresponding one of the intersection portions that are welded.

When each of the welding device pressurizes and welds the corresponding one of the intersection portions of the covered wires during this state, each of the spaces, which is ensured around the corresponding intersection portion, allows the corresponding intersection portion to spread out in the direction of width of the corresponding core part.

According to another embodiment (hereinafter referred to as a second wire fixing jig) of the invention, the supporting portions comprise pairs of columnar elements provided on the fixing jig body in such a way as to project therefrom so that the columnar elements of each of the pairs are opposed to each other. Further, the covered wires are supported by opposed portions, which are opposed to each other, of the columnar elements of each of the pairs in a state in which the covered wires are placed on the fixing jig body.

According to the second wire fixing jig of the invention, when the covered wires are placed on the wire fixing body so that each of the covered wires intersects with a corresponding one of the remaining covered wires, each of the covered wires is supported by the corresponding pair of columnar elements of the supporting portions.

Another embodiment (hereinafter referred to as a third wire fixing jig) of the invention further comprises a plurality of insulating columnar portions provided on the fixing jig body at predetermined pitches so that the insulating columnar portions and the supporting portions insulate the welded intersection portions of the covered wires.

According to the third wire fixing jig of the invention, the welded intersection portions adjoining the covered wires are insulated by the insulating columnar elements and the supporting portions.

An embodiment (hereinafter referred to as a fourth wire fixing jig) of the third wire fixing jig of the invention further comprises a lid, which is securely fixed to an end portion of each of the insulating columnar portions, for closing a side, at which the covered wires are place, of the fixing jig body.

According to the fourth wire fixing jig of the invention, each of the welded intersection portions is insulated from the exterior by closing the side, on which the covered wires are placed, of the fixing jig body with the lid.

DETAILED DESCRIPTION OF THE PREFERRED EMBODIMENTS

Figure 1:
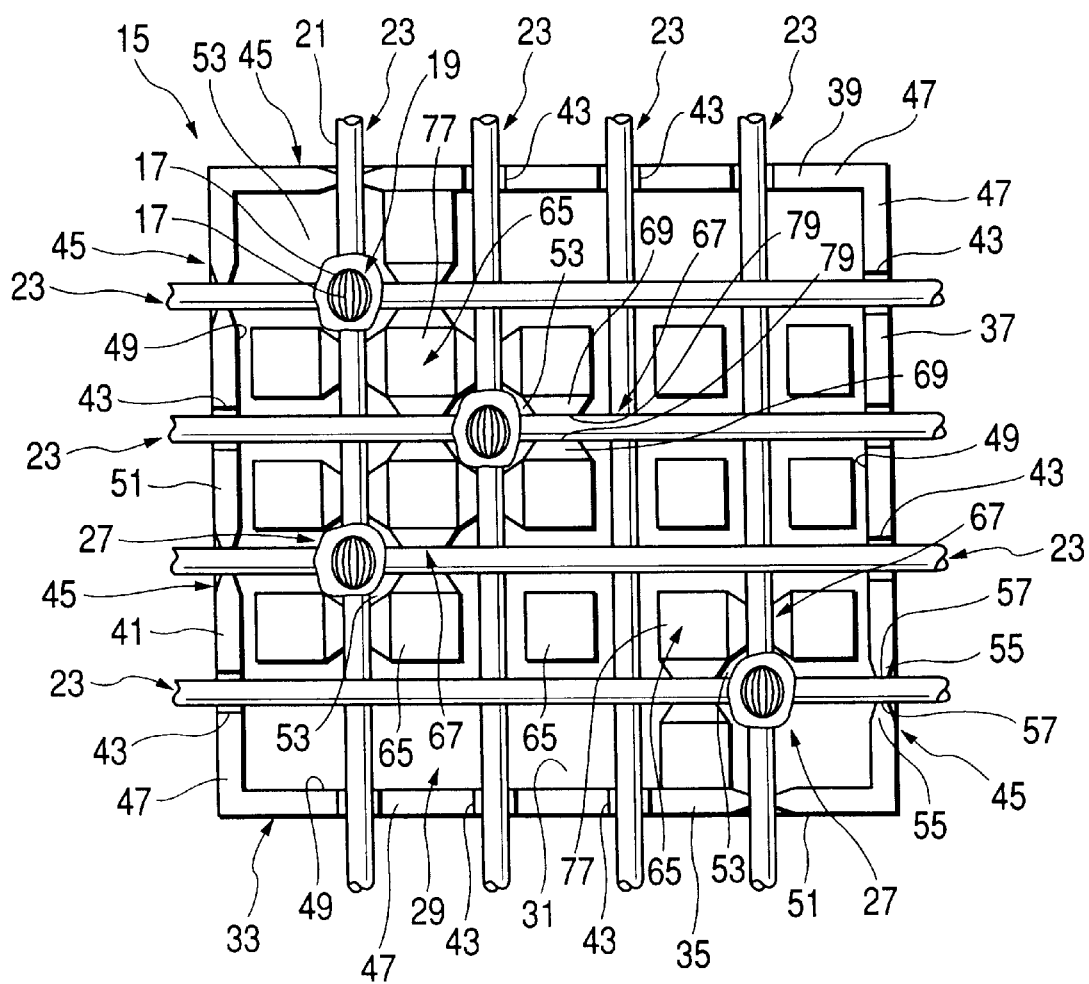
FIG. 1 is a plan view illustrating a state in which a plurality of covered wires are welded to each other by using a wire fixing jig according to a first embodiment of the invention.

Hereinafter, wire fixing jigs according to embodiments of the invention are described. FIG. 1 is a plan view illustrating a state in which a plurality of covered wires are welded by using a wire fixing jig 15 according to a first embodiment of the invention.

As shown in FIG. 1, in the wire fixing jig 15, a plurality of covered wires 23 each having a core part 19, which is constituted by a plurality of electrical conductors 17 and insulated by being coated with a cover portion 21, are arranged so that each of the covered wires 23 intersects with a corresponding one of the remaining covered wires 23. The wire fixing jig 15 fixes the plurality of covered wires 23 by being used when intersection portions 27 are welded by simultaneously being pressurized by a pair of ultrasonic welding horns 25 (See FIGS. 2 and 3) serving as welding device so as to form a predetermined circuit. As shown in FIG. 1, the wire fixing jig 15 comprises a plate-like fixing jig body 29 on which the plurality of covered wires 23 are arranged so that each of the covered wires 23 intersects with the corresponding one of other covered wires 23.

The fixing jig body 29 is formed like a plate, and has a nearly-square-shaped horizontal cross-section. The covered wires 23 are placed on a side surface 31 in a grating-like manner. An outer peripheral wall 33 is provided along the outer peripheral of the fixing jig body 29.

The outer peripheral wall 33 has first to fourth walls 35, 37, 39 and 41, each of which is formed like a rectangular plate in such a way as to protrude from the side surface 31 of the fixing jig body 29. The first to third wall portions 35, 37 and 39 are of substantially the same shape and each have a plurality of groove portions 43 and a supporting portion 45, which are provided at predetermined pitches from one end to the other end in the longitudinal direction thereof. The fourth wall portion 41 has supporting portions 45 and groove portions 43, which are alternately provided at predetermined pitches from one end to the other end in the longitudinal direction thereof. The covered wires 23 are inserted into such outer peripheral walls 33 through the groove portions 43 or the supporting portions 45. This enables the arrangement of the covered wires 23 on the side surface 31 of the fixing jig body 29 in a grating-like manner.

The aforementioned groove portions 43 are formed in a range from an end surface 47 in a direction, in which the wall portions 35, 37, 39 and 41 protrude from the fixing jig body 29, to the base-end side and penetrate the wall portions 35, 37, 39 and 41 from the inner peripheral surface 49 to the outer peripheral surface 51. The groove portions 43 are formed so that the dimension in the direction of width thereof is slightly larger than the diameter of the cover portion 21 of each of the covered wires 23, and so that the dimension in the direction of depth thereof is larger than the diameter of each of the cover portion 21 of each of the covered wires 23. Furthermore, each of the groove portions 43 is formed so that bottom part thereof formed at the base-end side follows the shape of the outer peripheral surface of the cover portion 21 of the covered wires 23.

The supporting portions 45 are placed around the intersection portions 27, in each of which a corresponding pair of the covered wires 23 are welded to each other, in a state in which the covered wires 23 are placed in the fixing jig body 29. The supporting portions 45 support a part extending in the longitudinal direction of a corresponding one of the covered wires 23. Further, the supporting portions 45 and the outer peripheral wall 33 form a space defined among the corresponding intersection portion 27 to be welded. Furthermore, each of the supporting portions 45 comprises a pair of columnar elements 55.

The pair of columnar elements 55 is formed like columnar bodies so that each of these columnar elements 55 has a nearly trapezoidal cross-section. The dimension measured in the direction of width of each of the columnar elements gradually decreases toward an end thereof. These columnar elements 55 are provided on the side surface 31 of the fixing jig body 29 in such a way as to project therefrom. Further, each of the columnar elements 55 is formed so that the base end part thereof is integrated with the outer peripheral wall 33 and serves as a part thereof. Further, each of the columnar elements 55 has a corresponding one of opposed portions 57 opposed to each other.

The pair of opposed portions 57 is respectively constituted by end portions of the columnar elements 55, and respectively has surfaces that are nearly parallel and opposed to each other. The opposed portions 57 are formed so that the distance therebetween is approximately equal to the diameter of the outer peripheral surface of the cover portion 21 of each of the covered wires 23. Further, each pair of the opposed portions 57 clamps the cover portion 21 of a corresponding one of the covered wires 23 in a state in which this covered wire 23 is supported by the corresponding supporting portions 45.

Moreover, a plurality of insulating columnar portions 65 are provided inside the outer peripheral wall 33. Each of the insulating columnar portions 65 is formed in such a manner as to have a rectangular cross-section. Furthermore, each of the insulating columnar portions 65 is provided in such a way as to have a projecting height, which is nearly equal to that of the outer peripheral wall 33 and as to project from the side surface 31 of the fixing jig body 29. These insulating columnar portions 65 are placed at portions surrounded by the covered wires 23 and at portions surrounded by the outer peripheral wall 33 and the covered wires 23 in a state in which the covered wires 23 are disposed on the fixing jig body 29 in a grating-like manner. Further, each of the insulating columnar portions 65 is formed so that the dimension in the direction of width of the cross-section thereof and the dimension in the longitudinal direction thereof are smaller than each of the pitches at which the groove portions 43 and the supporting portions 45 are provided. The insulating columnar portions 65 and a plurality of supporting portions 67 (to be described later) form spaces 53 defined among the outer peripheral wall 33 and the intersection portion 27 to be welded. Incidentally, the insulating columnar portions 65 may be omitted according to the specifications of the wire fixing jig 15.

Further, each of the insulating columnar portions 65 disposed around the corresponding one of welded intersection portions 27 has the supporting portions 67 each formed between this insulating columnar portion 65 and each of the adjacent covered wires 23. The supporting portions 67 support the covered wires 23 at positions, which are located at predetermined pitches from the corresponding one of the intersection portions 27 of the covered wires 23 in the longitudinal direction thereof, in a state in which the covered wires 23 are placed on the fixing jig body 29. Each of the supporting portions 67 comprises a pair of columnar elements 69 disposed in such a way as to be opposed to each other.

Each of the pair of columnar elements 69 is formed like a columnar body having a trapezoidal cross-section, and provided in such a manner as to project from the side surface 31 of the fixing jig body 29. The base end portion of each of the pair of columnar elements 69 is formed in such a way as to be integrated with the outer peripheral surface of the corresponding insulating columnar portion 65 and as to extend along the longitudinal direction thereof. The dimension in the direction of width of each of these columnar portions 69 gradually decreases toward the tip end thereof. Furthermore, the opposed columnar portions 69 have opposed portions 79, respectively, similarly as the supporting portions 45 provided on the outer peripheral surface 33.

Further, a plurality of through holes (not shown) are provided in the fixing jig body 29. The through holes are provided at positions respectively corresponding to the intersection portions 27 in a state in which the covered wires 23 are placed on the fixing jig body 29. Each of the through holes penetrates through the fixing jig body 29 from the side surface 31 thereof to the other side surface. The diameter of each of these through holes is nearly equal to that of each of the pair of horns 25. When the intersection portions 27 of the covered wires 23 are welded, one of the pair of horns 25 is inserted into and penetrates through the corresponding intersection portion 27.

Figure 4:
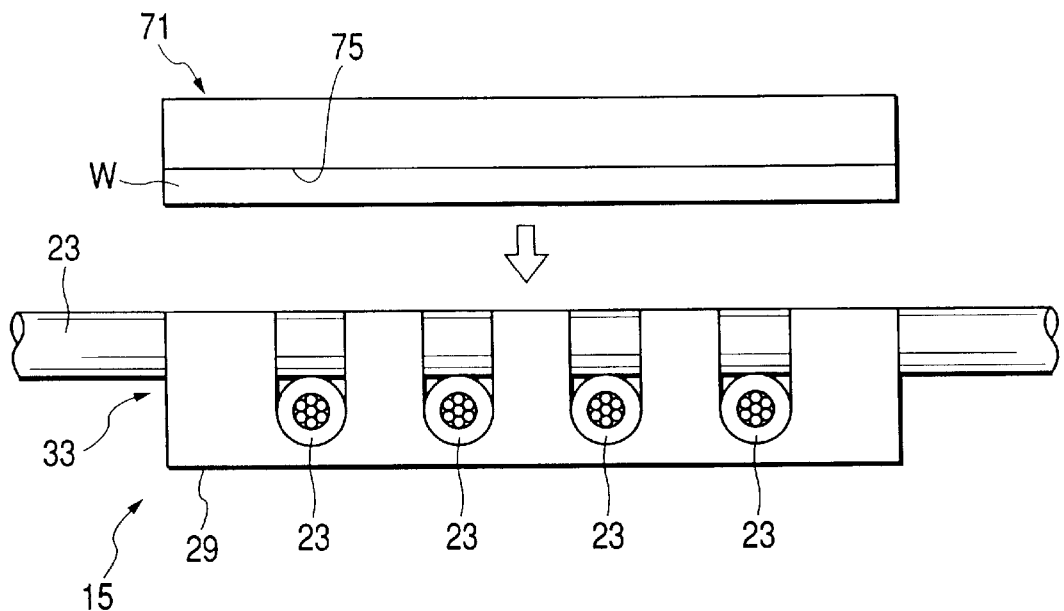
FIG. 4 is a side view illustrating an operation of assembling a lid to the wire fixing jig shown in FIG. 1.
Figure 5:
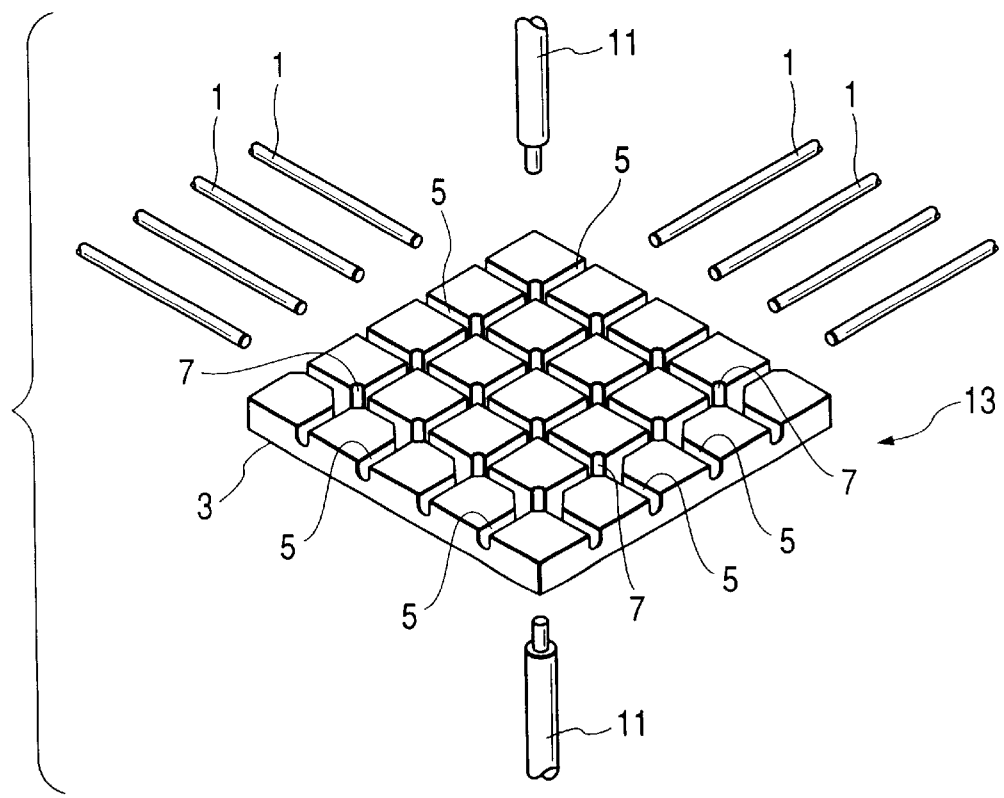
FIG. 5 is a perspective view illustrating a conventional wire fixing jig.
Figure 6:
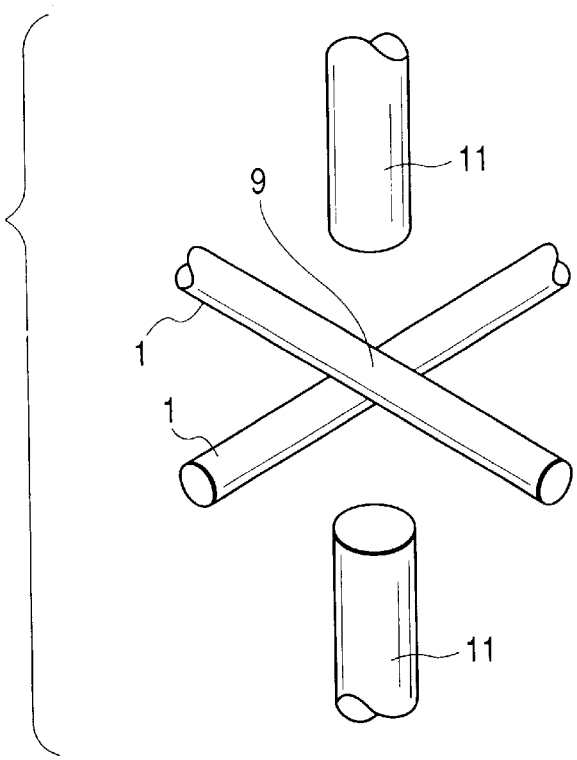
FIG. 6 is a perspective view illustrating an operation of welding intersection portions of electrical conductors to each other by using the wire fixing jig shown in FIG. 5.
Figure 7:
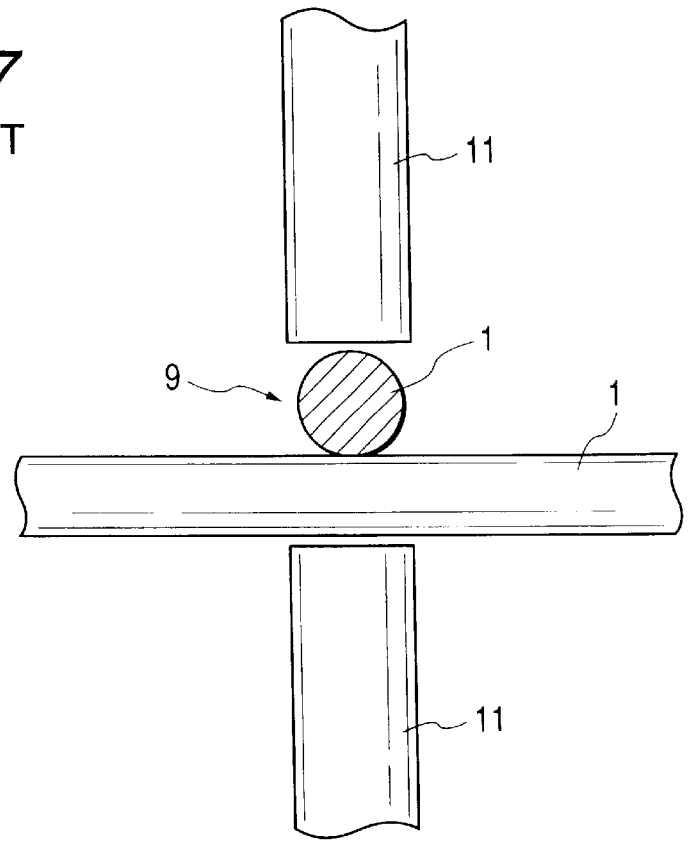
FIG. 7 is a side view illustrating a state in which the intersection portions of the conductors are welded to each other by using the wire fixing jig shown in FIG. 5.

As shown in FIG. 4, such a wire fixing jig 15 has a lid 71 assembled to the fixing jig body 29. The lid 71 is formed like a nearly-square-shaped plate so that the horizontal cross-section thereof is of nearly the same shape as that of the fixing jig body 29. This lid 71 is fixed to ends of the insulating portion 65 (not shown in this figure) and the outer peripheral wall 33 and operative to close a side corresponding to the side surface 31 (not shown in this figure) of the fixing jig body 29 in a state in which the intersection portions 27 (not shown in this figure) of the covered wires 23 placed on the fixing jig body 29 are welded.

When the covered wires 23 are connected to one another by using the wire fixing jig 15 formed in the aforementioned way, first, the covered wires 23 are arranged on the fixing jig body 29 in a grating-like manner, as shown in FIG. 1. Subsequently, the predetermined intersection portions 27 of the covered wires 23 arranged on the fixing jig body 29 are welded according to the design of a circuit. Thereafter, the lid 71 is assembled to the fixing jig body 29.

When the covered wires 23 are arranged on the fixing jig body 29 in a grating-like manner, first, the covered wires 23 are passed thereinto from the first wall portion 35 to the third wall portion 39 and placed on the fixing jig body 29 in such a way as be parallel to one another. At that time, first, the covered wires 23 are respectively placed thereon in such a manner as to correspond to the groove portions 43 and the supporting portions 45 provided between the opposed first wall portion 35 and the third wall portions 39, which are in a nearly straightly extending state. Then, the covered wires 23 are moved toward the side surface 31 of the fixing jig body 29 and accommodated in the groove portions 43 and the spaces each formed between the supporting portions 45, to which the covered wires are preliminarily made to correspond. Thereafter, such operations are repeatedly performed a plurality of times.

Subsequently, the covered wires 23 are passed thereinto from the second wall portion 37 to the fourth wall portion 41 and placed on the fixing jig body 29 in such a way as to be parallel to one another. At that time, first, both sides in the longitudinal direction of each of the covered wires 23 are respectively placed thereon in such a manner as to correspond to the groove portions 43 and the supporting portions 45 provided between the opposed second wall portion 37 and first wall portion 35 and the fourth wall portion 41, which are in a nearly straightly extending state. Then, the covered wires 23 are moved toward the side surface 31 of the fixing jig body 29 and accommodated in the groove portions 43 or the spaces each formed between the supporting portions 45, to which the covered wires are preliminarily made to correspond. Thereafter, such operations are repeatedly performed a plurality of times.

In this state, each of the covered wires 23 is supported around the corresponding one of the intersection portions 27, which is formed at the side of the outer peripheral wall 33 and welded to the covered wires 23, by the supporting portions 45 which is provided on the outer peripheral wall 33, or the supporting portions 67 which are provided between the insulating columnar portions 65, at positions, which are located at predetermined pitches form the corresponding intersection portion 27, at both sides in the longitudinal direction thereof. Thus, the covered wires 23 are fixed to the fixing jig body 29 around each of the intersection portions 27 welded at the side of the outer peripheral wall 33.

Further, the outer peripheral wall 33, the supporting portions 45, the insulating columnar portions 65 and the supporting portions 67, which are placed around each of the intersection portions 27 welded at the side of the outer peripheral wall 33, form the space 53 between this intersection portion 27 and each of these constituent elements. Moreover, these constituent elements surround each of such intersection portions 27 by being placed in such a way as to go around this intersection portion 27.

Furthermore, each of the covered wires 23 is supported by the supporting portions 67 at positions, which are located at predetermined pitches from the corresponding intersection portion 27, at both sides in the longitudinal direction thereof around the corresponding welded intersection portion 27 thereof, around which the insulating columnar portions 65 are placed. Thus, the covered wires 23 are fixed onto the fixing jig body 29 around the welded intersection portions 27, around which the insulating column portions 65 are placed.

Further, the insulating columnar portions 65 and the supporting portions 67 form the space 53 defined among these portions and the intersection portions 27 around the welded intersection portions 27, around which the insulating column portions 65 are placed. Moreover, these portions 65 and 67 surround each of such intersection portions 27 by being placed in such a way as to go around this intersection portion 27.

In the state, in which the covered wires 23 are placed on the fixing jig body 29 in a grating-like manner, the predetermined intersection portions 27 are welded by the pair of horns 25 according to the design of the circuit.

Figure 2:
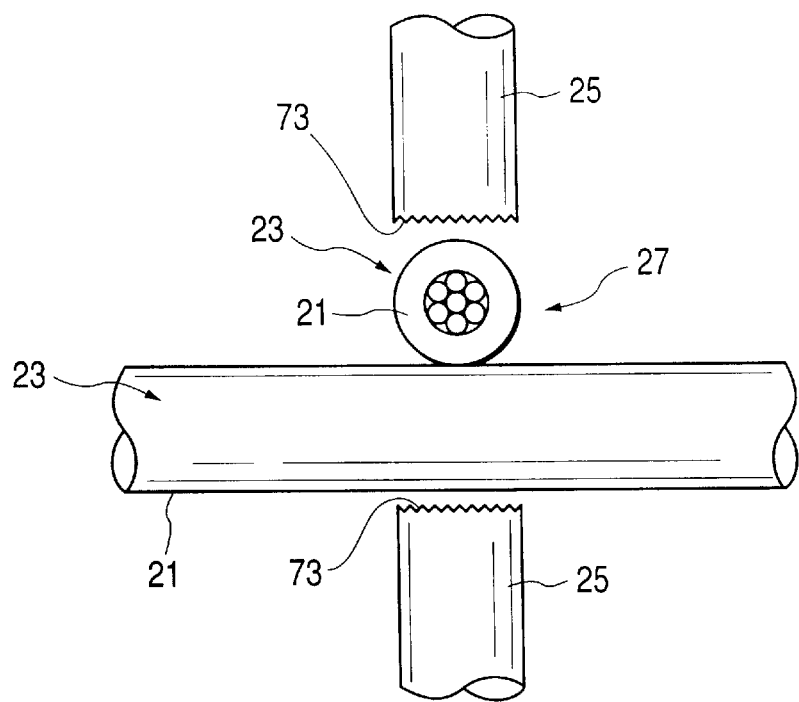
FIG. 2 is a side view illustrating the wire fixing jig at the time of welding intersection portions of the covered wires to each other.

When the intersection portions 27 of the covered wires 23 are welded, each of the intersection portions 27 and a corresponding pair of horns 25 serving as the welding device are made to coincide with one another, as illustrated in FIG. 2. During this state, the pair of horns 25 are proximity-driven in such a way as to be brought close to each other so that the end surfaces 73 thereof abut against the outer peripheral surfaces of the cover portions 21 of the covered wires 23, which constitute the intersection portions 27. At that time, between the pair of horns 25, one of the horns 25 is accommodated in the through hole formed in the fixing jig body 29 (not shown in this figure). Thus, the cover portions 21 of the covered wires 23 are ultrasonic-vibrated by the horns 25 while pressurized.

Figure 3:
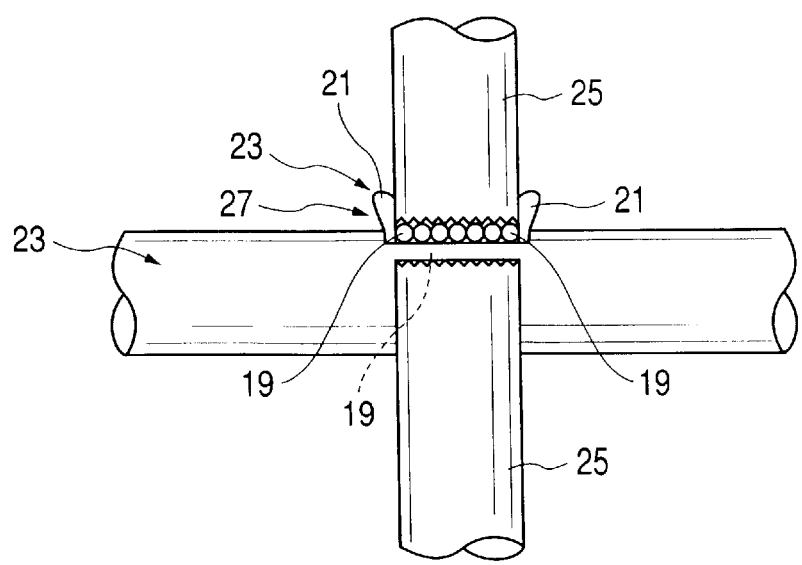
FIG. 3 is a side view illustrating a state in which the intersection portions of the covered wires are welded to each other.

When the intersection portion 27 is ultrasonic-vibrated by the horns 25 while pressurized, the covered wires 23 constituting the intersection portions are pressure-contacted to each other by being pressurized, as illustrated in FIG. 3, so that the outer peripheral surfaces of the cover portions 21 are brought into intimate contact with each other. These cover portions 21 brought into intimate contact with each other are melted by the ultrasonic-vibration. At that time, the melted cover portions 21 are partly gasified and dispersed. Concurrently, the remaining parts of the cover portions 21 are pushed by the covered wires 23, which are pressure-contacted with each other, and extruded outwardly. The extruded parts of the cover portions 21 are accommodated in the space 53 provided around the corresponding intersection portion 27. Consequently, the core parts 19 of the covered wires 23 pressure-contacted with each other are exposed to the outside and electrically conducted.

Then, the intersection portions 27 are pressurized and ultrasonic-vibrated by the horns 25 still more. Thus, the end surfaces 73 of the horns 25 are put into intimate contact with the outer peripheral surfaces of the cover portions 21 by the pressurization. Moreover, the cover portions 21 put into intimate contact with the end surfaces 73 of the horns 25 are melted by the ultrasonic-vibration. At that time, the melted cover portions 21 are partly gasified and dispersed. Concurrently, the remaining parts of the cover portions 21 are pushed by the end surfaces 73 of the horns 25 and the core parts 19 owing to the pressurization performed by the horns 25, and extruded to the outside. The extruded parts of the cover portions 21 are accommodated in the space 53 provided around the corresponding intersection portion 27, as shown in FIG. 1.

When the intersection portions 27 are pressurized and ultrasonic-vibrated by the horns 25 during this state, each of the core parts 19 is spread in the direction of width thereof and pressure-contacted with each other by the pressurization. Moreover, the core parts 19 pressure-contacted with each other by the ultrasonic-vibration are welded to each other. At that time, the melted and extruded parts of the cover portions 21 of the core parts 19 are accommodated in the spaces 53, which are provided around the intersection portions 27. Furthermore, each of the covered wires 23 is supported at the positions, which are located at the predetermined pitches from the corresponding intersection portion 27, at both sides in the longitudinal direction thereof. Additionally, the space 53 is formed around each of the intersection portions 27. Thus, each of the core parts 19 is allowed to be spread in the direction of width thereof at the corresponding intersection portion 27. Therefore, as illustrated in FIG. 3, each of the core parts 19 is put into a nearly parallel condition as a whole at the corresponding intersection portion 27 and reliably welded thereto.

Further, the lid 71 is assembled to the fixing jig body 29 in a state in which the intersection portions 27 of the plurality of covered wires 23, which are placed thereon, are welded thereto. When the lid 71 is assembled to the fixing jig body 29, the lid 71 is moved from the inner surface 75 to the side surface 31 of the fixing jig body 29, as shown in FIG. 4. At that time, the lid 71 and the fixing jig body 29 are set so that the horizontal cross-sections thereof coincide with each other.

As illustrated in FIG. 1, when the lid 71 is moved to the fixing jig body 29, the inner surface 75 (not shown in this figure) of the lid 71 (not shown in this figure) abuts against the end surface 77 of each of the insulating portions 65 and the end surfaces 47 of the first to fourth wall portions 35, 37, 39 and 41. At that time, as illustrated in FIG. 4, the inner surface 75 of the lid 71 is bonded onto the end surfaces 77 of the insulating columnar portions 65 and the end surfaces 47 of the first to fourth wall portions 35, 37, 39 and 41 by preliminarily applying an adhesive W onto the inner surface 75 of the lid 71. Consequently, the lid 71 is fixed to the fixing jig body 29.

In this state, the space 53 formed around each of the welded intersection portions 27 is closed by the lid 71 (though this is not shown in the figure). The welded intersection portions 27 are insulated from the exterior. Moreover, the movement of the covered wires 23 on the side surface 31 of the fixing jig body 29 is restrained by the lid 71 to thereby prevent the covered wires 23 from slipping off the fixing jig body 29.

Although it has been described in the foregoing description of this embodiment that the covered wires 23 are arranged in a grating-like manner, the invention may be applied to the case that a single pair of the covered wires 23 is made to intersect with and welded to each other. Further, although the welding device is implemented by the ultrasonic welding device, resistance welding device may be employed as the welding device.

In the wire fixing jig 15 according to this embodiment, the covered wires 23 are supported by the supporting portions 45 or 67 around the welded intersection portions 27. Thus, the intersection portions 27 are prevented from being displaced when welded. Consequently, the intersection portions 27 are reliably welded.

Furthermore, when the intersection portions 27 are welded, the melted and extruded cover portions 21 are accommodated in the spaces 53 formed therearound. Thus, each of the core parts 19 is spread in the direction of width thereof without enlarging the through holes, which should be enlarged in the conventional jig. Consequently, each of the core parts 19 is reliably welded at the corresponding intersection portion without enlarging the corresponding pair of horns 25. Moreover, the connection among the covered wires 23 is electrically stabilized.

Furthermore, when the intersection portions 27 are welded by the horns 25, each of the covered wires 23 is supported at positions, which are located at predetermined pitches from the corresponding intersection portion 27, at both sides in the longitudinal direction thereof. Moreover, the space 53 is formed around each of the intersection portions 27. Thus, each of the core parts 19 is allowed to be spread in the direction of width thereof still more at a corresponding one of the intersection portions 27. The whole covered wires 23 are brought into a nearly parallel state. Consequently, the intersection portions 27 are reliably welded. Therefore, the core parts 19 of the covered wires 23 are more reliably welded at the intersection portions 27 thereof in the state in which the intersection portions 27 are welded. The connection between the core parts 19 are electrically stabilized.

Furthermore, in the wire fixing jig 15, each of the core parts 19 is allowed to be spread in the direction width thereof at the corresponding intersection portion 27 without enlarging the through holes, which should be enlarged in the conventional jig. Thus, when the intersection portions 27 are welded, the positioning of the pairs of horns 25 onto the intersection portions 27 is achieved by accommodating one of the horns 25 of each of the pairs in the corresponding through hole provided in the fixing jig body 29 without increasing the size of each of the pair of horns 25.

Further, when the intersection portions 27 are welded by the corresponding pair of horns 25, the positioning of the pair of horns 25 onto the corresponding intersection portion 27 is achieved. Thus, the intersection portions 27 are reliably welded by preventing an occurrence of inconvenience conditions, for example, preventing the horns 25 from being displaced from the corresponding intersection portion 27. Consequently, the welding accuracy is improved when the intersection portions 27 are welded by the corresponding pair of horns 25.

In the wire fixing jig 15 according to this embodiment, each of the welded intersection portions 27 is surrounded by the insulating columnar portions 65 and the supporting portions 45 or by the outer peripheral wall 33 and the supporting portions 67. Thus, the adjoining welded intersectionportions 27 are insulated from one another. Consequently, the wire fixing jig 15 is used both as a fixing means for connecting the covered wires 23 and as an arranging means for arranging the covered wire 23 in a vehicle body after the covered wires 23 are connected to one another.

Further, in the wire fixing jig 15, the intersection portions 27 welded by closing the space 53 by means of the lid 71 are insulated from the exterior. Thus, the insulation of each of the welded intersection portions 27 is easily performed by assembling the lid 71 to the fixing jig body 29. Consequently, the workability in an insulating operation is enhanced.

In the aforementioned embodiment, the outer peripheral wall 33 is provided along the outer peripheral edge of the fixing jig body 29. However, the outer peripheral wall 33 may be omitted. In this case, the insulating columnar portions 65 are placed on the outer peripheral side of the fixing jig body 29.

Further, although the supporting portions 67 are provided only around the welded intersection portions 27 of the covered wires 23 on the side surface 31 of the fixing jig body 29, the supporting portions 67 may be provided on the entire side surface 31 of the fixing jig body 29. In this case, each of the covered wires 23 is supported by the supporting portions 67 at a plurality of positions in the longitudinal direction thereof in a state in which the covered wires 23 are placed on the fixing jig body 29. Thus, the fixing of the of the covered wires 23 to the fixing jig body 29 is more reliably performed.

Furthermore, although the lid 71 is provided in the wire fixing jig 15, the lid 71 may be omitted. In this case, the wire fixing jig is used as a welding jig for the intersection portions 27 of the covered wires 23. Upon completion of welding the intersection portions 27, the covered wires 23 are removed from the wire fixing jig. Further, the welded intersection portions 27 are insulated by tape-wrapping.

Additionally, although the supporting portions 45 (or 67) are constituted by a pair of rectangular-plate-like columnar or prismatic bodies 55 (or 69), the supporting portions may be constituted by a pair of cylindrical bodies having a circular cross-section.

As described above, according to the wire fixing jig of the invention, each of the covered wires is supported by the supporting portions provided around the corresponding one of the welded intersection portions. Thus, the intersection portions are prevented from being shifted when welded. Consequently, the intersection portions are reliably welded.

Further, when the intersection portions are welded by the welding device, each of the spaces ensured by the supporting portions allows a corresponding one of the core parts to be spread around in the direction of width of the corresponding core part. Thus, each of the core parts is reliably welded at the corresponding intersection portion. Consequently, the connection among the plurality of the covered wires is electrically stabilized.

Moreover, each of the spaces, which are ensured by the supporting portions, permits the corresponding core part to be spread in the direction of width of the corresponding core part. Thus, the through holes, which would be enlarged in the conventional fixing jig, are not enlarged. Consequently, the positioning of the welding device onto the intersection portions is achieved without increasing the size of the welding device.

According to the wire fixing jig of the invention, each of the covered wires is supported by the opposed portions of the corresponding pair of columnar elements. Thus, each of the covered wires is reliably fixed at a position, which is located at a predetermined pitch from the corresponding intersection portion, at both sides in the longitudinal direction thereof.

According to the wire fixing jig of the invention, the welded intersection portions adjoining a plurality of covered wires are insulated by the insulating columnar elements and the supporting portions. Thus, the wire fixing jig is used as means for arranging the covered wires.

According to the wire fixing jig of the invention, each of the welded intersection portions is insulated from the exterior by closing the side, on which the covered wires are placed, of the fixing jig body with the lid. Thus, the insulation of the welded intersection portions is easily performed by assembling the lid to the fixing jig body. Consequently, the workability in an insulating operation is enhanced.

What is claimed is:

1. A wire fixing jig for arranging a plurality of covered wires, each of which is provided with a conductive core coated with an insulating cover, to intersect with each other, and for fixing said covered wires when intersection portions thereof are welded by being pressurized with a welding device to form a predetermined circuit, said wire fixing jig comprising:

a plate-shaped fixing jig body;

a plurality of supporting portions, formed around said intersection portions of said covered wires to be welded, each supporting portion supporting a corresponding one of said covered wires at a predetermined position, said supporting portions being located at predetermined distances from a corresponding one of said intersection portions, on both sides of said corresponding one of said covered wires in a longitudinal direction thereof, and ensuring a space that allows said conductive cores of each of said intersection portions, which are pressurized when welded, to spread outwardly in a direction parallel to a plane in which said covered wires are disposed; and a plurality of through holes provided in said fixing jig body corresponding to said intersection portions of said covered wires placed on said fixing jig body and adapted so that said welding device is inserted into each of said through holes when said intersection portions are welded to each other;

wherein each of said supporting portions comprise a pair of columnar elements projecting from said fixing jig body so that said pair of said columnar elements are opposed to each other at a pair of opposed portions provided thereof, and wherein said covered wires are supported by said opposed portions of said pair of columnar elements in a state in which said covered wires are placed on said fixing jig body, wherein each of said columnar elements has a substantially trapezoidal cross-section in a plane which is parallel to the plane in which said covered wires are disposed, and wherein a width of said columnar element gradually decreases toward an end thereof.

2. The wire fixing jig according to claim 1, further comprising a plurality of insulating columnar portions provided on said fixing jig body at predetermined distances so that said insulating columnar portions and said supporting portions insulate said welded intersection portions.

3. The wire fixing jig according to claim 2, further comprising a lid securely fixed to an end portion of each of said insulating columnar portions, for closing a side of said fixing jig body, at which said covered wires are placed.

4. A wire fixing jig for arranging a plurality of covered wires, each of which is provided with a conductive core coated with an insulating cover, to intersect with each other, and for fixing said covered wires when intersection portions thereof are welded by being pressurized with a welding device to form a predetermined circuit, said wire fixing jig comprising:

a plate-shaped fixing jig body;

a plurality of supporting portions, formed around said intersection portions of said covered wires to be welded, each supporting portion supporting a corresponding one of said covered wires at a predetermined position, said supporting portions being located at predetermined distances from a corresponding one of said intersection portions, on both sides of said corresponding one of said covered wires in a longitudinal direction thereof, and ensuring a space that allows said conductive cores of each of said intersection portions, which are pressurized when welded, to spread outwardly in a direction parallel to a plane in which said covered wires are disposed; and a plurality of through holes provided in said fixing jig body corresponding to said intersection ions of said covered wires placed on said fixing jig body and adapted so that said welding device is inserted into each of said through holes when said intersection portions are welded to each other;

wherein each of said supporting portions comprise a pair of columnar elements projecting from said fixing jig body so that said pair of said columnar elements are opposed to each other at a pair of opposed portions provided thereof, and wherein said covered wires are supported by said opposed portions of said pair of columnar elements in a state in which said covered wires are placed on said fixing jig body, wherein each of said columnar elements has a substantially prismatic cross-section in a plane which is parallel to the plane in which said covered wires are disposed, and wherein a width of said columnar element gradually decreases toward an end of said columnar element which supports said covered wires.

5. The wire fixing jig according to claim 4, further comprising a plurality of insulating columnar portions provided on said fixing jig body at predetermined distances so that said insulating columnar portions and said supporting portions, insulate said welded intersection portions.

6. The wire fixing jig according to claim 5, further comprising a lid securely fixed to an end portion of each of said insulating columnar portions, for closing a side of said fixing jig body, at which said covered wires are placed.

7. A wire fixing jig for arranging a plurality of covered wires, each of which is provided with a conductive core coated with an insulating cover, to intersect with each other, and for fixing said covered wires when intersection portions thereof are welded by being pressurized with a welding device to for a predetermined circuit, said wire fixing jig comprising:

a plate-shaped fixing jig body;

a plurality of supporting portions, formed around said intersection portions of said covered wires to be welded, each supporting portion supporting a corresponding one of said covered wires at a predetermined position, said supporting portions being located at predetermined distances from a corresponding one of said intersection portions, on both sides of said corresponding one of said covered wires in a longitudinal direction thereof and ensuring a space that allows paid conductive cores of each of said intersection portions, which are pressurized when welded, to spread outwardly in a direction parallel to a plane in which said covered wires are disposed; and a plurality of through holes provided in said fixing jig body corresponding to said intersection portions of said covered wires placed on said fixing jig body and adapted so that said welding device is inserted into each of said through holes when said intersection portions are welded to each other;

wherein each of said supporting portions comprise a pair of columnar elements projecting from said fixing jig body so that said pair of said columnar elements are opposed to each other at a pair of opposed portions provided thereof, and wherein said covered wires are supported by said opposed portions of said pair of columnar elements in a state in which said covered wires are placed on said fixing jig body, and wherein; each of said columnar elements has a substantially cylindrical cross-section in a plane which is parallel to the plane in which said covered wires are disposed.

8. The wire fixing jig according to claim 7, further comprising a plurality of insulating columnar portions provided on said fixing jig body at predetermined distances so that said insulating columnar portions and said supporting portions insulate said welded intersection portions.

9. The wire fixing jig according to claim 8, further comprising a lid securely fixed town end portion of each of said insulating columnar portions, for closing a side of said fixing jig body, at which said covered wires are placed.

10. A wire fixing jig for arranging a plurality of covered wires, each of which is provided with a conductive core coated with an insulating cover, to intersect with each other, and for fixing said covered wires when intersection portions thereof are welded by being pressurized with a welding device to form a predetermined circuit, said wire fixing jig comprising:

a plate-shaped fixing jig body;

a plurality of supporting portions, formed around said intersection portions of said covered wires to be welded, each supporting portion supporting a corresponding one of said covered wires at a predetermined position, said supporting portions being located at predetermined distances from a corresponding one of said intersection portions, on both sides of said corresponding one of said covered wires in a longitudinal direction thereof, and ensuring a space that allows said conductive cores of each of said intersection portions, which are pressurized when welded, to spread out; and a plurality of through holes provided in said fixing jig body corresponding to said intersection portions of said covered wires placed on said fixing jig body and adapted so that said welding device is inserted into each of said through holes when said intersection portions are welded to each other wherein each of said supporting portions comprise a pair of columnar elements projecting from said fixing jig body so that said pair of said columnar elements are opposed to each other at a pair of opposed portions provided thereof, and wherein said covered wires are supported by said opposed portions of said pair of columnar elements in a state in which said covered wires are placed on said fixing jig body;

wherein each of said columnar elements has a substantially trapezoidal cross-section in a plane which is parallel to the plane in which said covered wires are disposed, so that a width of said columnar element gradually decreases toward an end thereof.

11. The wire fixing jig according to claim 10, further comprising a plurality of insulating columnar portions provided on said fixing jig body at predetermined distances so that said insulating columnar portions and said supporting portions insulate said welded intersection portions.

12. The wire fixing jig according to claim 11, further comprising a lid securely fixed to an end portion of each of said insulating columnar portions, for closing a side of said fixing jig body, at which said covered wires are placed.

* * * * *